Oct. 9, 1923.
T. E. POOLER
DIGGER
Filed Aug. 27, 1921
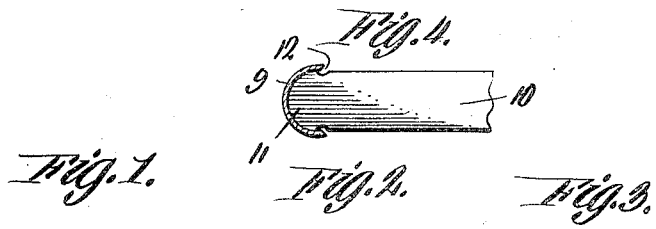
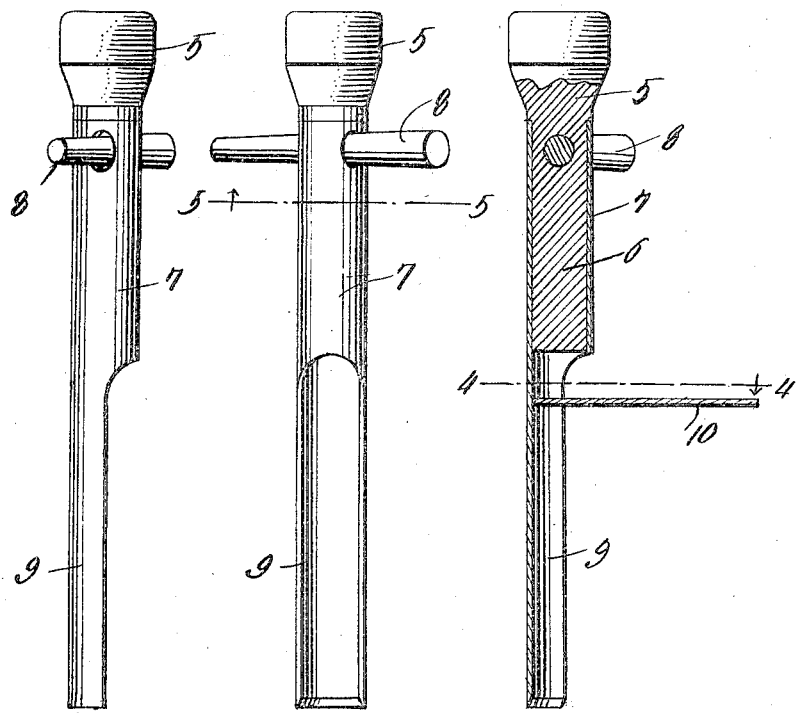
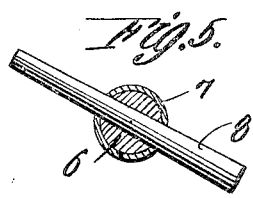
THOMAS E. POOLER, INVENTOR.
BY Richard B. Owen, ATTORNEY.

Patented Oct. 9, 1923.

1,470,284

UNITED STATES PATENT OFFICE.

THOMAS E. POOLER, OF PUEBLO, COLORADO.

DIGGER.

Application filed August 27, 1921. Serial No. 496,080.

*To all whom it may concern:*

Be it known that I, THOMAS E. POOLER, a citizen of the United States, residing at Pueblo, in the county of Pueblo and State of Colorado, have invented certain new and useful Improvements in a Digger, of which the following is a specification.

The device which is the subject matter of the present invention is designed more particularly for removing dandelions or other weeds from the ground, and the object of the invention is to provide a novel and improved device of this kind which will be efficient in operation in the surest and speediest manner, without disturbing or in any way injuring the soil or surrounding earth.

In order that the invention may be better understood, reference is had to the accompanying drawings, in which:—

Figure 1 is an elevation of the device,

Figure 2 is a similar view taken at right angles to Figure 1,

Figure 3 is a vertical central section taken through the device,

Figure 4 is a transverse section taken through the device on line 4—4 of Figure 3 looking in the direction of the arrow, and Figure 5 is a transverse section taken through the device on the line 5—5 of Figure 2 looking in the direction of the arrow.

In carrying out the invention, there is provided a wooden or other suitable handle 5 which is provided with a shank 6 for receiving the tube 7. The tube 7 and shank 6 are provided with registering apertures so as to receive the wedge pin 8 which is preferably constructed so as to project equally from diametrically opposite points on the tube 7 as shown to advantage in Figure 2 so as to aid in pulling the device from the ground as will be afterwards explained. The tube 7 is cut-away throughout its major portion starting adjacent the lower end of the shank 6 so as to form the blade 9 which has its end and side edges beveled or sharpened. This blade 9 is substantially semi-circular in cross section.

A paddle 10 which is provided with a rounded end 11 which is separated from the body of the paddle by a pair of notches 12 is adapted to be used in connection with the blade 9 for removing the dirt and weeds therefrom.

In operation, the blade is thrust straight down into the ground near the main root of the dandelion or other weeds, and given a slight turn, after which it is withdrawn by placing the fingers in engagement with the wedge pin 8. As the blade penetrates the ground and is turned, it cuts all the projecting fibers or rootlets around the main root, and upon withdrawing the blade, the weed or dandelion and its roots are brought up without disturbing the surrounding soil beyond the circle described by the blade. The dirt and weed held within the blade may now be removed by placing the rounded end 11 of the paddle 10 within the upper portion of the blade as indicated in Figure 3 and by switching the same toward the end of the blade all the soil and the roots of the weed or dandelion will be removed. In this manner the weed can therefore be readily taken up without any disfigurement of a lawn and without destroying the weed in any way.

Having thus described my invention what I claim as new is:—

1. An implement of the class described comprising a handle having an elongated shank, a tube fitting over said shank and provided with a blade, and a wedge shaped pin passing transversely through the tube and the shank of the handle and extending beyond the periphery of the tube.

2. An implement of the class described comprising a handle having an elongated shank, a tube fitting over said shank and provided with a blade, and a wedge shaped pin passing transversely through the tube and the shank of the handle.

In testimony whereof I affix my signature in presence of two witnesses.

THOMAS E. POOLER.

Witnesses:
GEO. S. STEVENSON,
ROY REED.